United States Patent [19]
Aunstrup et al.

[11] 3,723,250

[45] Mar. 27, 1973

[54] PROTEOLYTIC ENZYMES, THEIR PRODUCTION AND USE

[75] Inventors: Knud Aunstrup, Farum; Otto Andresen, Copenhagen; Helle Outtrup, Vaerlose, all of Denmark

[73] Assignee: Novo Terapeutisk Laboratorium A/S, Copenhagen, Denmark

[22] Filed: Sept. 23, 1968

[21] Appl. No.: 761,546

[30] Foreign Application Priority Data

Oct. 3, 1967  Great Britain.....................45,046/67

[52] U.S. Cl. .........................195/62, 195/65, 195/29
[51] Int. Cl. ...............................................C12d 13/10
[58] Field of Search ......195/62, 63, 65, 66, 68, 63 P, 195/118; 210/11; 252/DIG. 12

[56] References Cited

OTHER PUBLICATIONS

MAXATASE, published by Royal Netherlands Fermentation Industries Ltd., Delft–Holland, April 1967.
Alcalase, published by Novo Industri, Copenhagen, Denmark, 1969 pp. 2–5.

*Primary Examiner*—Lionel M. Shapiro
*Attorney*—Synnestvedt & Lechner

[57] ABSTRACT

The invention relates to enzyme preparations containing novel proteolytic enzymes produced by cultivation of novel species of the genus Bacillus and showing useful activity at high alkalinities. The invention also relates to production of the novel proteolytic enzymes by cultivation of the novel species of the genus Bacillus in a nutrient medium having a pH-value within the range of 7 to 12. Finally the invention relates to a process of isolating the novel species referred to by effecting the isolation on nutrient media having a pH-value within the range of 9 to 11. The novel enzymes are particularly useful in detergent and dehairing compositions.

4 Claims, 3 Drawing Figures

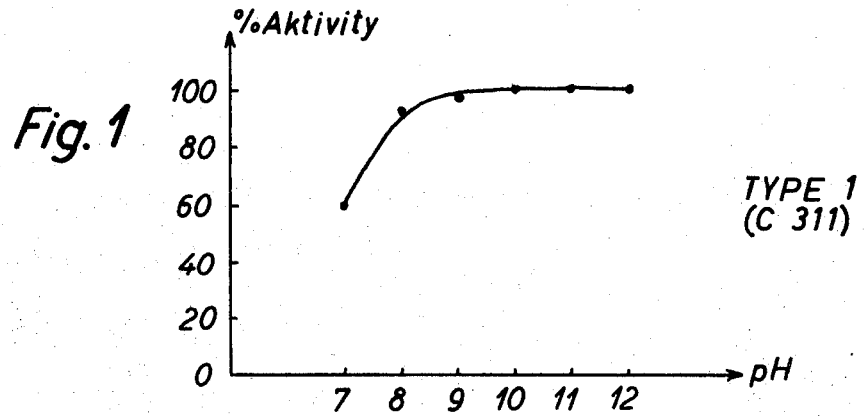
Fig. 1    TYPE 1 (C 311)
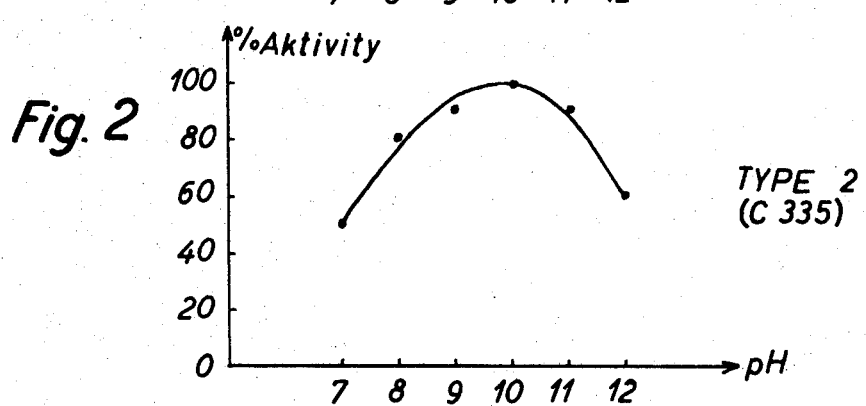
Fig. 2    TYPE 2 (C 335)
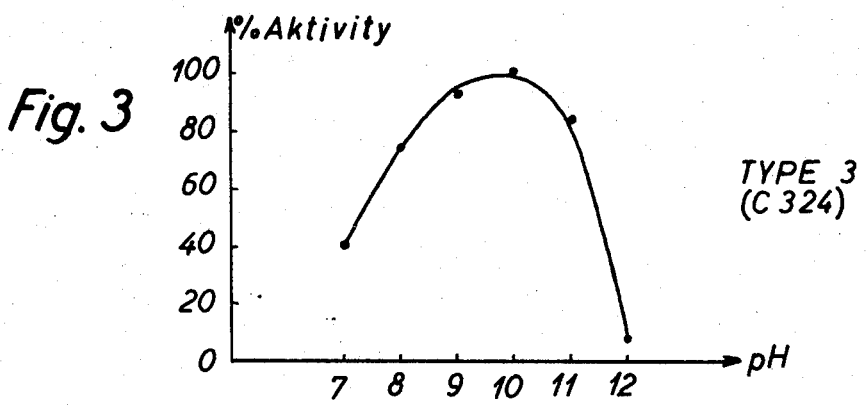
Fig. 3    TYPE 3 (C 324)

PROTEOLYTIC ENZYMES, THEIR PRODUCTION AND USE

This invention deals with preparations and compositions comprising new enzymes showing a pronounced and useful proteolytic activity at high alkalinities.

Within various fields there is demand for proteolytic enzymes and in some of these fields it is important that the enzymes display optimal proteolytic activities at high pH-values up to 10 to 12 and even higher, and that the enzymes are in possession of other useful properties, such as stability at elevated temperature and/or stability in the presence of non-enzymatic substances being a constituent part of the enzyme-containing preparations or compositions.

It is known that proteolytic enzymes can be produced by cultivation of certain bacteria under aerobic conditions, but the proteolytic enzymes produced by the known cultivations show optimal proteolytic activity against hemoglobin at a pH-value which in the most favorable cases did not reach more than 9.

The present invention is based on the observation that there exists in nature a great number of hitherto unknown bacteria forming during their metabolism proteolytic enzymes which display optimal proteolytic activity against hemoglobin at high pH-values up to 10 to 12, and which have other properties making them excellently suited for use within different industrial fields.

From samples of soil, animal manure and a number of other sources in nature the inventors have isolated about one hundred strains of bacteria, carried out taxonomic investigations and found that all of the hitherto unknown bacteria belong to the genus Bacillus, but that none of them belonged to any species known to the inventors, and that, to the best of the inventors' knowledge, they did not belong to the same species. Furthermore, within the same species there were in most cases different strains and several varieties.

For the purpose of isolating the hitherto unknown bacteria referred to above, use has been made of a novel technique which is characterized by the fact that the isolation is effected on nutrient media having a pH-value within the range of 9 to 11, and intended for detection of production of proteolytic enzymes.

In other words, the samples of soil, animal manure or other sources from nature have been spread on nutrient media having the high pH-value referred to and the bacteria able to grow under such alkaline conditions are then isolated and subjected to further investigations as to species and enzyme production.

In most cases, use has, according to the invention, also been made of a number of different enrichment methods.

Enrichment methods are known in the art. Reference can be made to Hayaishi, Methods in Enzymology, Vol. 1, 126–131. One principle is to let a sample from nature grow on a nutrient medium having a specific and selected composition favoring the growth of a microorganism giving metabolic products having the properties aimed at. Another principle is to store the sample from nature together with a compound, such as an inorganic salt, favoring the development of the desired microorganism, cfr. M.A. El-Nakeeb and H.A.Lechevalier, Appl. Microbiol., Vol. 11, 75 (1963), and thereafter to spread the sample on a suitable nutrient medium adjusted on a pH-value within the range of 8 to 12.

Some of the hitherto unknown members of the genus Bacillus which have been isolated and tested taxonomically and for production of proteolytic enzymes are compiled in Table I below, in which the first column contains the inventors' reference number, the second column the number under which the bacterium has been deposited at The National Collection of Industrial Bacteria, Torry Research Station, Aberdeen, Scotland, the third column the source of isolation, and the fourth column the enrichment method used.

TABLE I

| Ref. No. | Number NCIB | Source of isolation | Enrichment method |
|---|---|---|---|
| C 300 | 10144 | Soil from cemetery in Copenhagen. | Starch-casein medium (pH raised stepwise from 10 to 12). |
| C 301 | 10145 | ....do.... | |
| C 302 | 10146 | Soil from Copenhagener river bank. | Spreading of soil samples on agar with sesquicarbonate (pH=9.6–9.8). Testing of zones of hydrolysis on neutral agar with skim milk. |
| C 303 | 10147 | Heap of soil and leaves from cemetery in Copenhagen. | |
| C 304 | 10148 | Wood sand from Blokhus, Jutland. | |
| C 311 | 10281 | Wood soil from Ascheberg, Holstein. | Perborate agar. |
| C 323 | 10282 | Field soil from Danish town. | Do. |
| C 324 | 10283 | Lake bank soil from Ascheberg, Holstein. | Do. |
| C 325 | 10284 | Infection on plate with perborate holes. | Alkaline skim milk agar plates with holes filled with sodium perborate. |
| C 326 | 10285 | ....do.... | |
| C 334 | 10286 | Bank river soil from Danish town. | Perborate agar. |
| C 335 | 10287 | Garden soil from Danish town. | Do. |
| C 336 | 10288 | Horse and elephant manure. | Do. |
| C 337 | 10289 | Clay from grass field from Ascheberg, Holstein. | Perborate storing. |
| C 338 | 10290 | Soil from cemetery in Copenhagen. | Do. |
| C 339 | 10291 | Bank river soil from Danish town. | Perborate agar. |
| C 340 | 10292 | ....do.... | Do. |
| C 341 | 10293 | Field soil from Danish town. | Do. |
| C 342 | 10294 | Garden soil from Danish village. | Soda storing. |
| C 343 | 10295 | Garden soil from Danish town. | Perborate agar. |
| C 346 | 10296 | Chicken yard soil from Danish town. | Multiple alkaline starch enrichment. |
| C 347 | 10297 | Deer manure from deer park near Copenhagen. | Do. |
| C 348 | 10298 | Chicken run soil. | |
| C 349 | 10299 | Deer manure from deer park near Copenhagen. | Do. |
| C 350 | 10300 | Water from Copenhagener lake. | Alkaline starch-casein medium with tripolyphosphate. |
| C 351 | 10301 | Chicken manure. | Thermophile sesquicarbonate enrichment (50° C.,) pH 8.8 to 9.7. |
| C 352 | 10302 | Ostrich manure from Zoo. | Sodium sesquicarbonate enrichment (pH 9.2–9.6). |
| C 353 | 10303 | Manure from elephant | Do. |
| C 354 | 10304 | Chicken yard soil.. | Enrichment on basic glucose nitrate at 40° C. |
| C 355 | 10305 | ....do.... | Do. |
| C 356 | 10306 | Garden bark | Enrichment on basic glucose nitrate at 50° C. |
| C 357 | 10107 | Chicken yard soil. | Do. |
| C 358 | 10308 | ....do.... | Do. |
| C 360 | 10309 | Garden soil from Danish town. | Perborate agar. |
| C 364 | 10310 | Lavatory cistern scraping. | Thermophile sesquicarbonate enrichment (50° C., pH; 8.8–9.7). |
| C 365 | 10311 | Liquid from tannery liming bath. | Bran-soda enrichment. |
| C 366 | 10312 | Baby faeces.. | Starch enrichment (pH 11) with inorganic nitrogen. |
| C 367 | 10313 | Manure from elephant.. | Thermophile sesquicarbonate enrichment (50° C., pH; 8.8–9.7). |
| C 369 | 10314 | Ostrich manure from zoo. | Proteose peptone (shake flasks) pH 9.7. |
| C 370 | 10315 | Scraping from tannery liming bath containers. | Alkaline mannitol-KNO₃ enrichment. |
| C 371 | 10316 | Manure from elephant.. | Proteose peptone (shake flasks) pH 9.7. |

TABLE I—Continued

| Ref. No. | Number NCIB | Source of isolation | Enrichment method |
|---|---|---|---|
| C 372 | 10317 | Clay from grass field from Ascheberg, Holstein. | Starch casein detergent enrichment. |
| C 373 | 10318 | Garden soil from Danish town. | Perborate agar. |
| C 374 | 10319 | Clay from grass field from Ascheberg, Holstein. | Ethylene diamine tetra-acetic acid sodium salt starch casein enrichment. |
| C 375 | 10320 | Ostrich manure from zoo. | Sodium sesquicarbonate enrichment (pH: 9.2–9.6). |
| C 376 | 10321 | Manure from elephant. | Do. |
| C 377 | 10322 | Water from hippopotamus basin. | Thermophile casein starch enrichment with NaOH. |
| C 378 | 10323 | Scraping from tannery liming bath containers. | Mannitol-KNO$_2$ enrichment. |
| C 410 | 10324 | Tiger manure | Thermophile sesquicarbonate enrichment (50° C., pH; 8.8–9.7). |
| C 411 | 10325 | Pigeon manure | |
| C 412 | 10326 | Chicken yard soil from Danish town. | Potato flour and sodium sesquicarbonate storing. |
| C 413 | 10327 | Clay from grass field from Ascheberg, Holstein. | Starch enrichment (pH 11) with inorganic nitrogen. |

The taxonomic investigations of all these members of the genus Bacillus have been carried out while using the methods described by Smith, Gordon & Clark in "Aerobic Spore-forming Bacteria," U.S. Department of Agr., Monograph No. 16 (1952). These methods are up till now considered the most suitable ones, but they had to be modified in view of the fact that all nutrient media had to be adjusted on a much higher pH-value than that indicated by Smith, Gordon & Clark because all the Bacillus species listed in Table I grow at elevated pH-values.

The bacteria can be divided rather accurately into morphological groups. These groups differ from each other to such an extent that they actually represent separate species.

Within the morphological groups variations in the biochemical reactions are found. On the basis of these variations the groups have subdivided into varieties which are represented by one or more strains.

SPECIES NO. I (belonging to morphological group I according to Bergey)

Morphology

Vegetative rods: 0.5 – 0.7 $\mu$ × 1.5 – 4 $\mu$
Spores: 0.5 – 0.8 $\mu$ × 0.8 – 1 $\mu$
   central to subterminal, oval to cylindrical, thin-walled.
Sporangia: Very little, if any, swelling of spores.
Variety a:
C 300, C 301, C 360, C 372, C 374
  Grampositive.
  Growth or nutrient agar pH 7.3 as good as or better than on nutrient agar pH 9.7.
  Maximum temperature for growth 50°–55°C.
  Scant growth, if any, on glucose- or mannitolagar pH 9.7 with nitrate as sole source of nitrogen.
  Hydrolysis of starch: Positive, narrow zone of hydrolysis after 7 days.
Variety b:
C 302, C 334.
  Grampositive.
  Growth on nutrient agar pH 7.3 rather slow during the first two days, thereafter nearly comparable to growth on nutrient agar pH 9.7.
  Maximum temperature for growth 40°–50°C.
  Scant growth, if any, on glucose- or mannitolagar pH 9.7 with nitrate as sole source of nitrogen.
  Hydrolysis of starch: Positive, wide zone of hydrolysis.
Variety c:
C 323, C 339, C 352, C 369.
  Grampositive or Gramvariable.
  Moderate to scant growth on nutrient agar pH 7.3.
  Maximum temperature for growth 37°–50°C.
  Scant growth, if any, on glucose- or mannitolagar with nitrate as sole source of nitrogen.
  Hydrolysis of starch: Positive, wide zone of hydrolysis.
Variety d:
C 304, C 311, C 336.
  Grampositive rods.
  Moderate to scant growth on nutrient agar at pH 7.3.
  Maximum temperature for growth: 37°C.
  Scant growth on glucose- or mannitolagar at pH 9.7 with nitrate as sole source of nitrogen.
  Hydrolysis of starch: negative.

SPECIES NO. II (belonging to morphological group I according to Bergey)

C 335, C 341.

Morphology:

Vegetative rods: 0.3 – 0.4 $\mu$ × 1.5 – 2.5 $\mu$
Spores: 0.3 – 0.5 $\mu$ × 0.8 – 1 $\mu$
   central to paracentral, oval to cylindrical, thin-walled.
Sporangia: Very little, or no, swelling by spores.
Grampositive
Almost no growth on nutrient agar at pH 7.3
Maximum temperature for growth: 37°C
No or scant growth on glucose- or mannitolagar with nitrate as sole source of nitrogen.
Hydrolysis of starch: Negative.

SPECIES NO. III

Morphology:

Vegetative rods: 0.6 – 0.7 $\mu$ × 1.5 – 3.5 $\mu$
   ends rounded.
Spores: 0.7 – 0.9 $\mu$ × 1.0 – 1.2 $\mu$
   ellipsoidal, paracentral to subterminal, thickwalled.
Sporangia: Some are definitely swollen, others are not. The rods in sporulated cultures swell and grow very thick but keep their original shape. Sporulating short rods may have a globular form at this stage. Thus, there is no local swelling at the site where the spore is placed, although some sporangia are spindle-shaped.
Variety a:
C 326, C 342.
  Grampositive.
  No or only scant growth on nutrient agar at pH 7.3.
  Maximum temperature for growth: 50°C.
  No or only scant growth on glucose- or mannitolagar at pH 9.7 with nitrate as sole source of nitrogen.
  Hydrolysis of starch: positive, wide zone of hydrolysis.

Variety b:
C 347, C 350.
  Grampositive.
  Moderate growth on nutrient agar at pH 7.3.
  Maximum temperature for growth: 50°C.
  Scant growth on glucose- or mannitolagar at pH 9.7 with nitrate as sole source of nitrogen.

Hydrolysis of starch: positive, wide zone of hydrolysis.

Variety c:

C 337, C 340.

Gramnegative or Gramvariable.
Moderate growth on nutrient agar at pH 7.3.
Maximum temperature for growth: 37° and 50°C, respectively.
Scant growth on glucose- or mannitolagar at pH 9.7 with nitrate as sole source of nitrogen.
Hydrolysis of starch: positive, wide zone of hydrolysis.

Variety d:

C 338, C 343, C 346, C 348, C 349.

Gramvariable or Gramnegative.
No or only scant growth on nutrient agar at pH 7.3.
Maximum temperature for growth: 45° – 50°C.
No or only very scant growth on glucose- or mannitolager at pH 9.7 with nitrate as sole source of nitrogen.
Hydrolysis of starch: positive, wide zone of hydrolysis.

Variety e:

C 324, C 355.

Grampositive.
No or only very scant growth on nutrient agar at pH 7.3.
Maximum temperature for growth: 45° – 50°C.
Moderate growth on glucose- or mannitolagar at pH 9.7 with nitrate as sole source of nitrogen.
Hydrolysis of starch: positive, wide zone of hydrolysis.

Variety f:

C 353

Gramnegative.
Moderate growth on nutrient agar at pH 7.3.
Maximum temperature for growth: 50°C.
Moderate growth on glucose- or mannitolagar at pH 9.7 with nitrate as sole source of nitrogen.
Hydrolysis of starch: positive, wide zone of hydrolysis.

SPECIES NO. IV (belonging to morphological group II according to Bergey).

Morphology

Vegetative rods: 0.4 – 0.5 $\mu$ × 2–3 $\mu$, often in long chains.
Spores: 0.6 – 0.8 $\mu$ × 0.7 – 0.9 $\mu$,
  oval, subterminal, thickwalled, easily stained.
Sporangia: Definitely swollen, clavate.

Variety a:

C 303, C 354, C 357, C 366, C 367, C 371, C 375, C 378.

Gramnegative.
Moderate to good growth on nutrient agar at pH 7.3.
Maximum temperature for growth: 57°C.
Moderate to good growth on glucose- or mannitolagar at pH 9.7 with nitrate as sole source of nitrogen.
Hydrolysis of starch: positive, moderate zone of hydrolysis.

Variety b:

C 351, C 356, C 364, C 376, C 377, C 411

Gramvariable.
Otherwise like variety a.

Variety c:

C 358, C 410.

Grampositive.
Otherwise like variety a.

SPECIES NO. V (belonging to morphological group II according to Bergey)

C 365, C 412

Morphology

Vegetative rods: 0.3 – 0.4 $\mu$ × 2–4 $\mu$, straight, some slightly bent
Spores: 0.6 – 0.7 $\mu$ × 0.9 – 1.2 $\mu$,
  oval to ellipsoidal, paracentral to terminal, thickwalled, easily stained, remnants of sporangia often adhering.
Sporangia: Definitely swollen, clavate to racket-shaped.
Grampositive.
Moderate to good growth on nutrient agar at pH 7.3.
Maximum temperature for growth: 57°C.
Good growth on glucose- or mannitolagar at pH 9.7 with nitrate as sole source of nitrogen.
Hydrolysis of starch: positive, moderate to wide zone of hydrolysis.

SPECIES NO. VI (belonging to morphological group II according to Bergey)

Morphology

Vegetative rods: 0.25 – 0.35 $\mu$ × 2.5 – 5 $\mu$.
  Slightly bent, ends pointed
Spores: 0.8 – 1 $\mu$ × 1.1 – 1.3 $\mu$.
  Oval to ellipsoidal, subterminal to terminal.
Sporangia: Definitely swollen, clavate to drumstick-shaped.

Variety a:

C 373

Gramnegative.
No or only scant growth on nutrient agar at pH 7.3.
Maximum temperature for growth: 50°C.
No or only very scant growth on glucose- or mannitolagar at pH 9.7 with nitrate as sole source of nitrogen.
Hydrolysis of starch: Positive, wide zone of hydrolysis.

Variety b:

C 325, C 413

Grampositive.
Moderate growth on nutrient agar at pH 7.3.
Maximum temperature for growth: 50°C.
No or only very scant growth on glucose- or mannitolagar at pH 9.7 with nitrate as sole source of nitrogen.
Hydrolysis of starch: Positive, wide zone of hydrolysis.

SPECIES NO. VII

C 370.

This strain was tentatively classified as a separate species.

It is asporogenous or oligosporogenous and therefore cannot be placed in any morphological group.

It seems mostly related to the alcaline bacteria which belong to the morphological group II of the genus Bacillus (according to Bergey).

Vegetative rods: 0.3 – 0.5 $\mu$ × 2 – 5 $\mu$,
  often in long chains, filamentous, ends slightly pointed and rounded.
Gramnegative.

Moderate to good growth on nutrient agar at pH 7.3.
Maximum temperature for growth: 57°C.
Good growth on glucose- or mannitolagar pH 9.7 with nitrate as sole source of nitrogen.
Hydrolysis of starch: Positive, moderate zone of hydrolysis.

The following characters are common to a number of strains belonging to the different varieties in the species I – IV:

Hydrolysis of gelatine: Positive
Hydrolysis of casein: Positive.
Glucose-nutrient agar slants — Growth same as on nutrient agar, or heavier.
Soybean agar slants — Growth more abundant and softer than on nutrient agar.
Tyrosine agar slants — Growth same as on nutrient agar.
Nutrient broth — Medium turbidity with abundant sediment. No pellicle or pellicle thin and friable.
NaCl broth — Good growth in 5 percent concentration of NaCl; growth at 7 percent.
Production of acetylmethylcarbinol — Negative.
Reduction of nitrate to nitrite — Positive.

Anaerobic growth in glucose broth — Scant, if any, growth; pH 7.8 or higher at 14 days. (pH of the medium adjusted to 9 before inoculation).

On the basis of the inventors' taxonomic investigations the members of the genus Bacillus listed in Table I should be classified as it appears from Table II below.

TABLE II

| Species: | Variety: | Strains: |
|---|---|---|
| I | a | C 300, C 301, C 360 |
| | | C 372, C 374 |
| | b | C 302, C 334 |
| | c | C 323 C 339, C 352, |
| | | C 369 |
| | d | C 304, C 311, C 336 |
| II | | C 335, C 341 |
| | a | C 326, C 342 |
| | b | C 347, C 350 |
| | c | C 337, C 340 |
| III | d | C 338, C 343, C 346, |
| | | C 348, C 349 |
| | e | C 324, C 355 |
| | f | C 353 |
| IV | a | C 303, C 354, C 357, |
| | | C 366, C 367, C 371, |
| | | C 375, C 378 |
| | b | C 351, C 356, C 364, |
| | | C 376, C 377, C 411 |
| | c | C 358, C 410 |
| V | | C 365, C 412 |
| VI | a | C 373 |
| | b | C 325, C 413 |
| VII | | C 370 |

All the strains referred to have also been grown on nutrient agar and soybean agar and some of them on glucose nitrate agar and mannitol nitrate agar, for the purpose of observing the form, appearance and color of the colonies, but as the relevance of these observations may be disputed, the results of the inventors' observations are not reported here.

However, the following Table III reviews the properties the variations of which form the basis for the division of varieties within the different morphological groups:

TABLE III

| Species | Var. | Gram stain | Growth on nutrient agar pH 7.3 | Maximum growth temp. | Growth on nitrate (NO₃ as sole N-source) | Hydrolysis of starch | Width of zone of hydrolysis on starch agar | Maximum growth velocity at pH |
|---|---|---|---|---|---|---|---|---|
| I | a | + | +++ | 50-55 | Scant | + | + | 8.0-9.5 |
| | b | + | ++ | 40-50 | Scant | + | +++ | 8.0-8.5 |
| | c | (+) | ++ | 37-40 | Scant | + | +++ | 8.3-8.8 |
| | d | + | ++ | 37 | Scant | − | − | 8.0-8.6 |
| II | | + | Scant | 37 | Scant | − | − | 8.0-9.0 |
| III | a | + | Scant | 50 | Scant | + | +++ | |
| | b | + | ++ | 50 | Scant | + | +++ | 8.3-9.0 |
| | c | −, var. | ++ | 37, 50 | Scant | + | +++ | |
| | d | −, var. | Scant | 45-50 | Scant | + | +++ | |
| | e | + | Scant | 45-50 | ++ | + | +++ | 8.5-9.0 |
| | f | − | ++ | 50 | ++ | + | +++ | |
| IV | a | − | +++ | 57 | +++ | + | ++ | 8.0-9.0 |
| | b | var. | +++ | 57 | +++ | + | ++ | 8.0-9.0 |
| | c | + | +++ | 57 | +++ | + | ++ | |
| V | | + | +++ | 57 | +++ | + | +++ | |
| VI | a | − | Scant | 50 | Scant | + | +++ | 8.5-9.2 |
| | b | + | ++ | 50 | Scant | + | +++ | |
| VII | | − | +++ | 57 | +++ | + | ++ | 8.0-8.5 |

NOTE.—Scant=poor; Stain=colour.

All the species and strains in Tables I and II have been cultivated with proteolytic enzyme production in view. This cultivation has been carried out both in shake flasks and in tanks in pilot plants with artificial aeration. The yields obtained have been determined by the well-known Anson hemoglobin method, cfr. Journal of General Physiology, 22, 79–89 (1959). One Anson unit means throughout this specification the amount of proteolytic enzyme digesting hemoglobin at a pH-value of 10.1 and a temperature of 25°C during a reaction time of 10 minutes with such an initial velocity that per minute there is formed such an amount of split products which cannot be precipitated with trichloracetic acid that these split products give the same color with phenol reagent as does one milliequivalent of tyrosine.

The process for producing the proteolytic enzymes belongs to the known art in which the enzymes are produced by aerobic cultivation of bacteria in a nutrient medium containing assimilable carbon and nitrogen sources, and the characteristic feature of the inventive process consists in maintaining a pH-value of the nutrient medium within the range of 7–12 during the cultivation, using species of the genus Bacillus able to grow and produce the proteolytic enzymes within the pH-range referred to, and recovering from the medium the proteolytic enzymes formed during the cultivation.

Experiments seem to show that it is convenient to carry out the cultivation at a pH-value of the culture medium within the range of 7.5 to 10.5.

The nutrient medium is composed in agreement with the principles of the known art. Suitable assimilable carbon sources are carbohydrates, such as saccharose, glucose, starch, flour from cereal grains, malt, rice, sorghum etc. The carbohydrate concentration may vary within rather great limits, e.g., up to 25 percent and down to 1 – 5 percent, but usually 8 – 10 percent would be suitable, the percentage being calculated as dextrose. It has been found that the presence in the nutrient medium of carbohydrates will give rise to the formation of acidic components, resulting in a decrease of the pH-value during the cultivation. As it is essential to maintain a pH-value of the nutrient medium within the range of 7 to 12 during the cultivation, measurements should be taken that the pH-value does not fall below 7 or any essential period during the cultivation. In order to keep the pH-value within the required range, a limited amount of carbohydrates may be used together with a buffer substance which is able to maintain the required pH-value. It has been found that carbonates, and particularly sesquicarbonates, used in a concentration of up to 0.2 M in the medium, is able to create a pH-value of about 10.5 and 9.3, respectively.

Also other buffer systems, such as phosphate buffers, may be used.

It is also possible to initiate the cultivation with a low carbohydrate content and to add small amounts of carbohydrates successively during the cultivation.

A third possibility is to make use of automatic pH-control by addition of various basic-reacting substances used in this art.

The use of carbonates and sesquicarbonates as pH-controlling substances is very useful and it is surprising that it is possible during the cultivation to use these compounds in the concentrations referred to.

The nitrogen source in the nutrient medium may be of inorganic and/or organic nature. Suitable inorganic nitrogen sources are sometimes nitrates and ammonium salts, and among the organic nitrogen sources there are quite a number known for use in fermentation processes and in the cultivation of bacteria. Illustrating examples are soy meal, cotton seed meal, peanut meal, casein, corn steep liquor, yeast extracts, urea, albumine, etc.

Besides, the nutrient medium should naturally contain the usual trace substances.

The temperature at which the cultivation takes place is normally within the same range as in the known cultivation of known species of the genus Bacillus. Usually a temperature between 25° and 55°C is convenient. The temperature is preferably 30° to 40°C.

As the cultivation has to be carried out under aerobic conditions, it is, when using fermentation tanks, necessary to make use of artificial aeration. The amount of air is similar to that used in the known cultivation processes.

In general, maximum yields of the proteolytic enzymes will be obtained after a cultivation time of 1 to 5 days.

Although most of the experiments in connection with the production of proteolytic enzymes from the species and strains compiled in Table II, have been carried out in shake flasks or in tanks in pilot plants, use has also been made of surface growth. In such case the nutrient medium consisted of 10 g of wheat bran, 2 g $Na_3PO_4$, $12H_2O$ and about 10 ml water. Prior to inoculation the pH-value was adjusted to about 10 with 2 ml 1 N NaOH. On this medium strains C 300 and C 303 were cultivated by surface growth, and for both strains the yield of proteolytic enzymes was about 20 Anson units per kg of wheat bran at pH 10.

For cultivation of the species and strains compiled in Table II the following two media were used:

1. Medium BPFA with the following composition:

| | |
|---|---|
| Potato flour | 50 g per liter of tap water |
| Saccharose | 50 g " |
| Barley flour | 50 g " |
| Soy meal | 20 g " |
| Sodium caseinate | 10 g " |
| $Na_2HPO_4 \cdot 12H_2O$ | 9 g " |
| Pluronic | 0.1 g " |

2. Medium BSX with the following composition:

| | |
|---|---|
| Barley flour | 100 g per liter of tap water |
| Soy meal | 30 g " |
| Pluronic | 0.1 g " |

Both these media were adjusted to the desired pH-value by the addition of sesquicarbonate or soda under sterile conditions.

The experiments in shake flasks were carried out in 500 ml shake flasks, each of the flasks containing 100 ml of the nutrient medium BPFA and BSX, respectively, which were sterilized beforehand by autoclaving for 90 minutes at 120°C and after the autoclaving the pH-value was adjusted to 9.3 – 10.5 with sodium sesquicarbonate. There were used four flasks for each bacterium, and samples from the culture media for determining the enzyme content expressed in Anson units were taken after cultivation in 3, 4, 5 and 6 days, respectively. The flasks were during the cultivation placed on a rotating table with 240 revolutions per minute.

In the following Table IV are compiled the maximum enzyme yields and the pH-value at that time.

TABLE IV

| Sp. | Var. | Strain | BPFA Anson units per kg | pH of medium | BSX Anson units per kg | pH of medium |
|---|---|---|---|---|---|---|
| | | C 300 | 19 | 6.5 | 19 | 9.5 |
| | | C 301 | 10 | 6.5 | 24 | 9.5 |
| | a | C 360 | 20 | 6.3 | 30 | 9.5 |
| | | C 372 | 20 | 6.4 | 15 | 9.3 |
| | | C 374 | 11 | 6.3 | 18 | 9.3 |
| | b | C 302 | 36 | 9.2 | 16 | 9.3 |
| I | | C 334 | 38 | 8.6 | 10 | 9.5 |
| | | C 323 | 22 | 7.6 | 9 | 10.0 |
| | | C 339 | 38 | 9.3 | 19 | 9.2 |
| | | C 352 | 32 | 9.1 | 33 | 9.5 |
| | c | C 369 | 115 | 9.3 | 16 | 9.3 |
| | | C 304 | 48 | 8.1 | 7 | 6.5 |
| | d | C 311 | 67 | 9.4 | 11 | 9.7 |
| | | C 336 | 2 | 8.0 | 1 | 9.1 |
| II | | C 335 | 38 | 9.5 | 3 | 10.0 |
| | | C 341 | 42 | 9.2 | 3 | 9.9 |

|   |   | Strain | | | | |
|---|---|--------|---|---|---|---|
|   |   | C 303 | 3 | 7.2 | 30 | 9.7 |
|   |   | C 354 | 17 | 9.0 | 11 | 9.1 |
|   |   | C 357 | 4 | 8.2 | 25 | 9.4 |
|   |   | C 366 | 5 | 8.7 | 30 | 9.5 |
| IV | a | C 367 | 4 | 8.8 | 35 | 9.4 |
|   |   | C 371 | 2 | 8.5 | 40 | 9.4 |
|   |   | C 375 | 1 | 7.6 | 30 | 9.6 |
|   |   | C 378 | 2 | 8.5 | 25 | 9.3 |
|   |   | C 351 | 2 | 8.3 | 30 | 9.7 |
|   |   | C 356 | 3 | 7.7 | 20 | 9.7 |
|   | b | C 364 | 3 | 8.3 | 40 | 9.3 |
|   |   | C 376 | 10 | 9.3 | 20 | 9.7 |
|   |   | C 377 | 1 | 7.8 | 9 | 9.7 |
|   |   | C 411 | 0 | — | 15 | — |
|   | c | C 358 | 2 | 7.1 | 25 | 9.6 |
|   |   | C 410 | 3 | — | 17 | — |
| V |   | C 365 | 60 | 8.2 | 55 | 9.5 |
|   |   | C 412 | 4 | — | 80 | — |
| VII |   | C 370 | 115 | 9.0 | 45 | 9.3 |
|   | a | C 326 | 47 | 9.5 | 5 | 9.8 |
|   |   | C 342 | 67 | 8.9 | 10 | 9.4 |
|   | b | C 347 | 44 | 9.3 | 7 | 9.1 |
|   |   | C 350 | 44 | 8.8 | 13 | 8.9 |
|   |   | C 337 | 78 | 8.0 | 13 | 9.6 |
|   | c | C 340 | 22 | 9.4 | 7 | 9.8 |
| III |   | C 338 | 72 | 8.2 | 7 | 7.7 |
|   |   | C 343 | 14 | 9.0 | 2 | 8.9 |
|   | d | C 346 | 26 | 8.5 | 5 | 9.4 |
|   |   | C 348 | 17 | 9.6 | 7 | 9.1 |
|   |   | C 349 | 21 | 9.0 | 11 | 9.2 |
|   | e | C 324 | 97 | 8.9 | 8 | 9.5 |
|   |   | C 355 | 60 | 9.1 | 6 | 9.2 |
|   | f | C 353 | 96 | 8.9 | 8 | 9.6 |
|   | a | C 373 | 12 | 7.3 | 1 | 6.4 |
| VI | b | C 325 | 1 | 9.5 | 1 | 6.5 |
|   |   | C 413 | 0 | — | 18 | — |

The two culture media BPFA and BSX have also been used for cultivation in tanks under submerged conditions and artificial aeration, use being made of 550 liter stainless steel tanks. To illustrate such cultivations in pilot plant reference is made to the following Table V giving information of the strains used, the cultivation conditions and the results obtained.

TABLE V

| Strain | C 324 | C 335 | C 339 | C 347 | C 351 |
|--------|-------|-------|-------|-------|-------|
| Medium | BPFA | BPFA | BPFA | BPFA | BSX |
| pH-value before inoculation | 9.3 | 10.3 | 10.5 | 10.2 | 10.2 |
| Cultivation temperature in Celsius degrees | 34 | 34 | 34 | 34 | 34 |
| Air, m³ per minute | 0.3 | 0.25 | 0.25 | 0.25 | 0.3 |
| Cultivation time in hours | 53 | 84 | 97 | 59 | 83 |
| Final pH-value | 8.3 | 9.2 | 9.1 | 8.9 | 9.35 |
| Final proteolytic activity expressed in Anson units per kg of substrate | 44 | 40 | 29 | 48 | 33 |

In other pilot plant cultivations use has been made of other strains with varying compositions of the cultivation medium. In the steel tanks referred to above strain C 303 has been cultivated in four runs under different conditions. The compositions of the cultivation media, the cultivation conditions and the results obtained are given in the following Table VI.

TABLE VI

| Cultivation No. | 1 | 2 | 3 | 4 |
|-----------------|---|---|---|---|
| Barley flour g/liter | 100 | 100 | 150 | 200 |
| Soymeal g/liter | 30 | 30 | 45 | 60 |
| Pluronic ml/liter | 0.03 | 0.03 | 0.03 | 0.03 |
| $Na_2CO_3$ (sterile addition before inoculation) ad | 0.2 M | 0.2 M | 0.2 M | 0.4 M |
| pH before inoculation | 10.0 | 10.0 | 10.35 | 10.1 |
| Cultivation temperature °C | 34 | 34 | 34 | 34 |
| Air m³/minute | 0.3 | 0.3 | 0.3 | 0.3 |
| Cultivation time in hours | 125 | 104 | 113 | 126 |
| pH at maximum | 9.3 | 9.3 | 9.6 | 9.3 |
| Maximum Anson units per kg | 67 | 80 | 77 | 66 |

The proteolytic enzymes can be recovered from the cultivation broth by subjecting the broth to centrifugation, precipitating the enzyme from the liquid thus obtained by addition of $Na_2SO_4$ or ethanol, separating the precipitate from the liquid by filtration with kieselguhr as filtration aid and drying the precipitate to form a powder containing the active proteolytic enzymes.

These recovery processes being considered as examples, only, may be illustrated by reference to Table VII below.

TABLE VII

| Strain: | C 339 | C 347 | C 351 |
|---------|-------|-------|-------|
| Starting material | 250 kg culture liquid containing 25 Anson units per kg | 250 kg culture liquid containing 45 Anson units per kg | 600 ml culture liquid containing 32 Anson units per liter |
| Total amount of Anson units | 6250 | 11250 | 19.2 |
| Centrifugation | 3000 rpm/30 min | 3000 rpm/30 min | 4000 rpm/30 min. |
| Precipitation | 35°C  85 kg $Na_2SO_4$ standing one hour | 35°C  85 kg $Na_2SO_4$ standing one hour | 0°C  1200 ml $C_2H_5OH$ |
| Filtration | 2.25 kg Kieselguhr filter press | filter press | none (centrifugation 30 min. 4000 rpm washing with 600 ml $C_2H_5OH$ at 0°C, centrifugation 4000 rpm/10 min.) |
| Drying | Drying chamber, 40°C | Drying chamber, 40°C | Vacuum, $P_2O_5$ |
| Enzyme powder | 4000 g containing 0.4 Anson units per g | 1300 g containing 0.8 Anson units per g | 9.7 g containing 1.3 Anson units per g |
| Yield | 1600 Anson units = 25% | 1020 Anson units = 9% | 12.6 Anson units = 65% |

The starting materials mentioned in Table VII have been produced by cultivation in 550 liter stainless steel tanks under artificial aeration. The nutrient media were adjusted on the initial pH-value by a 2 M $Na_2CO_3$ solution added under sterile conditions before the inoculation.

Testing of the proteolytic enzymes produced by the strains listed in Table II has shown that there are material differences between the enzymes regarding a number of their properties.

With regard to the proteolytic activity it seems that the enzymes may be divided into three groups or types when the proteolytic activity is measured at pH 12 and expressed in percentage of maximum activity, viz.

Type 1: 100 to 80 %
Type 2: 80 to 50 %
Type 3: 50 to 0 %

It is known in the art that calcium ions stabilize the activity of most of proteolytic enzymes. The novel enzymes produced by the bacteria listed in Table I and divided into species and varieties in Table II have been tested with regard to the stabilizing effect of calcium ions in a concentration of 0.01 M at pH 10.5 or 11, and the stabilization has been indicated in percentage of residual activity after standing 30 minutes at 50°C. The results of the enzyme type testing and the calcium ion stabilization effect are compiled in Table VIII, in which plus means that the residual proteolytic activity in the absence of calcium ions is below 80 percent of the corresponding activity of the control in the presence of calcium ions, and minus means that the residual proteolytic activity in the absence of calcium ions is above 80 percent of the corresponding activity of the control in the presence of calcium ions.

TABLE VIII

| Species | Var. | Strains: | Enzyme-type | Ca++ stabilization |
|---|---|---|---|---|
| I | a | C 300, C 301, C 360, C 372, C 374 | 1 | +++++ |
| | b | C 302, C 334 | 1 | ++ |
| | c | C 323, C 339, C 352, C 369 | 2 | ?+++ |
| | d | C 304, C 311, C 336 | 1 | +++ |
| II | | C 335, C 341 | 2 | ++ |
| | a | C 326, C 342 | 3 | ?+ |
| | b | C 347, C 350 | 3 | +? |
| | c | C 337, C 340 | 3 | ++ |
| III | d | C 338, C 343, C 346, C 348, C 349 | 3 | +???? |
| | e | C 324, C 355 | 3 | +? |
| | f | C 353 | 3 | + |
| | a | C 303, C 354, C 357, C 366, C 367, C 371, C 375, C 378 | 1 | ———? |
| IV | b | C 351, C 356, C 364, C 376, C 377, C 411 | 1 | –?—+ |
| | c | C 358, C 410 | 1 | –+ |
| V | | C 365, C 412 | 1 | –? |
| | a | C 373 | 1 | – |
| VI | b | C 325, C 413 | 1 | ?? |
| VII | | C 370 | 1 | – |

The proteolytic activity of the enzymes produced by the strains listed in Table VIII has been tested not only at pH 12, but also at lower pH-values to give a more detailed impression of the proteolytic activity at different pH-values and more information of the activity of the three types of enzymes.

For the purpose of illustration reference is made to the drawings on which

FIG. 1 shows the proteolytic activity of the enzyme produced by the strain C 311, said enzyme belonging to type 1, FIG. 2 in the same manner shows the activity of the enzyme produced by strain C 335, said enzyme belonging to type 2, and FIG. 3 in the same manner shows the activity of the enzyme produced by the strain C 324, said enzyme belonging to type 3.

It should be understood that the purpose of the activity curves shown on the drawings is to illustrate in principle the difference in activity of the three types of proteolytic enzymes at varying pH-values and that the activity curve for each type may vary somewhat without missing its characteristic appearance.

The novel enzymes according to the invention have furthermore been subjected to the following tests:

a. Stability against tripolyphosphate (TPP)

The stability of the enzymes in a solution containing tripolyphosphate in an amount of 0.2 percent was determined. The stability has been expressed as percentage of residual activity after 30 minutes at 50°C and at pH 10. The enzyme concentration was 0.1 Anson unit per liter and the method of analysis was the Anson method.

The results are compiled in the following Table IX.

The corresponding solutions with 0.01 M $CaCl_2$ showed in all cases a residual activity of 80 to 100 percent.

b. Stability against perborate

The activity of a solution containing the enzyme and sodium perborate in an amount of 0.1 percent was determined. The stability was expressed as percentage of residual activity after 30 minutes at 50°C and pH 10. The enzyme concentration and the method of analysis were as in test a).

The results are compiles in the following Table IX.

c. Stability against surfactants

The stability of solutions containing the enzyme and different surfactants was determined while using three typical surfactants in concentrations corresponding to those employed in the washing solution:

| | |
|---|---|
| 1. Soap | 0.25 g per liter |
| 2. DBS - an alkyl-aryl-sulphonate (50%) | 2.5 g per liter |
| 3. TAS -tallow-alcohol-sulphate (25%) | 5.0 g per liter. |

The enzyme concentration was 0.1 Anson unit per liter. The test conditions were 30 minutes at 50°C at pH 10, and the method of analysis was the nitro-casein-method, cfr. E.v. Pechmann, Biochemische Zeitschrift, Bd. 321, 248–260 (1950).

The figures in Table IX are to be understood as follows:

The figure above the stroke shows the percentage of residual activity, when one performs the analysis immediately after the addition of the surfactant, i.e., this figure gives an indication of the initial rate of inactivation.

The figure under the stroke is the difference between this initial residual activity and the percentage of residual activity after 30 minutes.

d. Temperature optimum

In Table IX is indicated the temperature in degrees of Celsius at which there was found maximum activity at pH 10. The method of analysis was the Anson method.

e. Enzyme type

It has been found that all the enzyme preparations are inhibited momentaneously and completely by phenylmethylsulphonylfluoride, which means that all the enzymes have serine in the active center.

f. pH-Stability.

In connection with five enzyme preparations the stability at different pH-values has been determined under the following conditions:

Standing: 24 hours at 25°C
pH-values: 5 – 7 – 8 – 10 – 12
Enzyme concentration: 0.2 Anson units per liter.

In Table IX is indicated the pH-range within which there was found a residual activity of 80 to 100 percent.

Testing of the enzyme preparations produced by strains C 303 and C 347 against sodium sulphite has shown that the enzymes are not sensitive to this reducing agent, which might indicate that S-S-bridges are not essential for the tertiary structure of the enzymes.

TABLE IX

| Strain | Enzyme preparation in powder form, g. | Activity, Anson units per g. at pH | Enzyme type | Stability TPP | Per-borate | Surfactants Soap | DBS | TAS | Temp., optimum °C. | Serine | pH stability |
|---|---|---|---|---|---|---|---|---|---|---|---|
| C 300 | 2 | 0.5 (10) | 1 | 2 | 89 | 82/71 | 56/48 | 7/6 | 50 | + | |
| C 301 | 2 | 0.7 (10) | 1 | 4 | 47 | 50/47 | 35/31 | 4/2 | 50 | + | |
| C 302 | 3 | 0.7 (10) | 1 | 1 | 48 | 59/56 | 60/— | 3/1 | 50 | + | |
| C 303 | 600 | 3.0 (7.5) | 1 | 91 | 95 | 85/50 | 40/30 | 23/18 | 60 | + | 6.0-10.5 |
| C 304 | 2.5 | 0.3 (7.5) | 1 | 2 | 4 | 57/56 | 34/31 | 3/0 | 50 | + | |
| C 334 | 1,500 | 0.5 (7.5) | 1 | 95 | 39 | 100/83 | 90/27 | 93/73 | 40 | + | |
| C 351 | 9 | 1.3 (7.5) | 1 | 78 | 66 | 93/67 | 67/50 | 53/45 | 60 | + | |
| C 354 | 42 | 0.6 (7.5) | 1 | 94 | 82 | 77/33 | 60/38 | 60/53 | 60 | + | |
| C 360 | 117 | 0.4 (7.5) | 1 | 0 | 83 | 97/94 | 76/70 | 75/75 | 50 | + | |
| C 364 | 456 | 0.9 (7.5) | 1 | 90 | 80 | 81/31 | 27/11 | 16/8 | 60 | + | |
| C 365 | 2,000 | 0.4 (7.5) | 1 | 94 | 86 | 100/0 | 72/20 | 92/48 | 60 | + | |
| C 366 | 26 | 0.8 (7.5) | 1 | 100 | 96 | 92/42 | 67/14 | 68/61 | 60 | + | |
| C 367 | 500 | 2.2 (7.5) | 1 | 94 | 100 | 88/2 | 58/34 | 71/52 | 60 | + | 5.0-11.0 |
| C 370 | 3,000 | 0.6 (7.5) | 1 | 89 | 91 | 94/4 | 33/15 | 67/30 | 60 | + | |
| C 371 | 50 | 1.0 (7.5) | 1 | 95 | 93 | 97/60 | 70/44 | 93/57 | 60 | + | |
| C 372 | 430 | 2.7 (7.5) | 1 | 6 | 60 | 98/95 | 75/68 | 87/85 | 50 | + | 6.0-10.5 |
| C 376 | 17 | 7.8 (7.5) | 1 | 88 | 78 | 66/42 | 25/10 | 15/12 | 60 | + | |
| C 377 | 213 | 1.9 (7.5) | 1 | 93 | 86 | 100/10 | 59/27 | 74/59 | 60 | + | |
| C 335 | 1,500 | 0.3 (7.5) | 2 | 60 | 29 | 95/51 | 40/32 | 78/71 | 55 | + | |
| C 339 | 217 | 1.4 (7.5) | 2 | 16 | 76 | 89/10 | 75/57 | 83/62 | 45 | + | 6.3-10.3 |
| C 369 | 7.2 | 1.4 (7.5) | 2 | 81 | 2 | 28/28 | 6/6 | 0/0 | 50 | + | |
| C 347 | 573 | 2.0 | 3 | 0 | 36 | 81/78 | 94/71 | 67/63 | 40 | + | 6.3-11.0 |

From Table IX it will be seen that a number of the enzyme preparations show astonishing stability properties.

In general, the enzyme preparations or compositions according to the invention consist of a solid or liquid mixture of the proteolytic enzymes produced according to the invention and other components the amount and composition of which depend on the purpose and technical or scientific field within which the enzyme compositions are to be used. When the enzyme preparations or compositions according to the invention are in solid form they can consist of granules into which the enzymes are incorporated, for instance together with other enzymes or substances having other than enzymatic activity useful for the utility of the enzyme compositions. When the enzymes are not used in crystalline form, they may be accompanied by impurities of organic nature, such as proteins and carbohydrates from the culture medium.

The enzyme compositions in liquid form can constitute solutions or suspensions which may contain stabilizers, if necessary.

Usually, the novel enzymes of the invention are used in small quantities. In view thereof the enzyme preparations or compositions for industrial use normally show an enzyme content not exceeding about 10 percent by weight.

The novel enzymes according to the invention can for instance be used in washing compositions, dehairing compositions, in preparations for hydrolysis of proteins, in dish-washing compositions and as additives to septic tanks and installations for purifying sewage.

Quite a number of tests have been carried out in connection with the utility of the enzyme preparations according to the invention in washing compositions and washing processes.

The washing experiments were carried out while using the EMPA test strips or swatches 116 and 112, respectively. In other words, in the washing experiments there have been used test strips soiled with blood, milk, and carbon black (No. 116) or with cocoa, milk, and sugar (No. 112). The experiments were carried out with the two types of test strips separately and each experiment was repeated three times at 50°C and 60°C. The enzyme concentration in the washing solution was 0.048 Anson units per liter.

The detergent which should represent a heavy duty detergent had the following composition: Hereinafter referred to as Detergent Formulation A

| | |
|---|---|
| Nansa S (40% sodiumalkylaryl sulphonate, 60% sodium sulphate) | 250 g |
| Nonyl phenol, 10 EO | 30 g |
| Soap (80%) | 30 g |
| Sodiumtripolyphosphate | 300 g |
| CMC (60 %) | 16 g |
| Sodiumcarbonate, anhydr. | 80 g |
| Sodiumsulphate, anhydr. | 74 g |
| Sodiumperborate ($NaBO_3,4 H_2$) | 220 g |
| Total | 1000 g |

The other conditions were as follows:

| | |
|---|---|
| Hardness of water in German units | 10° |
| Fabric to water ratio | 1:40 |
| Time of experiment | 30 minutes |
| pH-value | about 10 |
| Detergent concentration: | 4.0 g per liter of washing solution |

The washing process carried out at 50°C was as follows:

By means of a pipette 20 ml of the enzyme solution with an activity of 0.288 Anson units per liter were added to a 150 ml beaker. Beforehand, the pH-value was adjusted to 10.0 and the temperature to 20°C. At zero time there were added 100 ml detergent solution adjusted to pH 10.3 and 56°C. The concentration of the detergent was 4.8 g per liter. The beaker was immediately placed in a water thermostate at 50°C and 6 circular EMPA-test swatches were added with a total weight of 3.0 g. Agitation was effected with a glass spatula during 10 seconds and the beaker was standing in the thermostate 30 minutes in total, agitation being effected during 10 seconds every 4 minutes. Then the wash solution was separated, and the pH-value was measured after cooling. The test swatches were rinsed in running tap water during 10 minutes and then dried between two towels and ironed. Every test swatch was subjected to remission measurements in a Beckman spectrophotometer at 460 m$\mu$.

In addition to these experiments control experiments were carried out in which the enzyme solution was replaced by water.

In the experiments carried out at 60°C the temperature of the detergent solution was adjusted to 68°C.

The results of these experiments are compiled in the following table X

TABLE X

Remission of EMPA test swatches

| Enzyme from strain | untreated | 116 after soaking and rinsing 50°C | 60°C | untreated | 112 after soaking and rinsing 50°C | 60°C |
|---|---|---|---|---|---|---|
| None | 11.9 | 14.6 | 17.8 | 34.0 | 41.1 | 40.3 |
| C 303 |  | 32.6 | 33.4 |  | 41.5 | 43.9 |
| C 339 |  | 27.0 | 23.0 |  | 39.3 | 39.7 |
| C 351 |  | 30.0 | 27.2 |  | 40.5 | 40.2 |
| C 367 |  | 34.0 | 33.0 |  | 39.7 | 41.3 |
| C 377 |  | 34.0 | 33.2 |  | 41.7 | 43.8 |
| C 364 |  | 33.6 | 31.0 |  | 41.9 | 43.5 |
| C 372 |  | 38.1 | 29.7 |  | 43.6 | 42.5 |
| C 376 |  | 32.7 | 32.7 |  | 42.4 | 43.2 |
| C 366 |  | 35.8 | 33.5 |  | 41.2 | 41.5 |

The remission values are average figures of measurements of each of the six test swatches in each of the experiments.

Another series of washing experiments has been carried out with EMPA-test swatches No. 116 previously treated with a solution containing an anionic surfactant and sodium perborate at a temperature of 40°C during 20 minutes. After the treatment the test swatches were rinsed and dried. The treatment with perborate results in a heavy fixation of the soiling, which would then be more difficult to remove.

The detergent had the following composition:

| | |
|---|---|
| Nonylphenol, 10 EO | 80 g |
| Sodiumtripolyphosphate | 400 g |
| CMC (45%) | 20 g |
| Sodium carbonate, anhdr. | 150 g |
| Sodium sulphate, anhydr. | 350 g |
| Total | 1000 g |

Further conditions:

| | |
|---|---|
| Water | 10°German hardness |
| Fabric to water ratio | 1:40 |
| Period | 30 minutes |
| Temperature | 45° C |
| pH | about 10 |
| Detergent concentration | 4.0 g per liter of wash solution |

The procedure was as reported in the washing experiments mentioned above, except that the wash solution had a temperature of 50°C before it was mixed with the enzyme solution.

There were carried out three experiments with each of the enzymes, and the results appear from the following Table XI.

TABLE XI

| Enzyme from strain | Remission of EMPA-test swatch No. 116 |  |
|---|---|---|
|  | untreated | after soaking and rinsing |
| None | 16.4 | 18.7 |
| C 303 |  | 36.8 |
| C 339 |  | 32.3 |
| C 351 |  | 31.0 |
| C 367 |  | 34.3 |
| C 377 |  | 37.6 |
| C 364 |  | 34.6 |
| C 372 |  | 43.2 |
| C 376 |  | 36.8 |
| C 366 |  | 37.3 |

The remission values are average figures of the measurements of each of the six test swatches in each of the experiments, except that the values in connection with the experiments with enzymes from strain C 339 and C 351 are based on one measurement.

Experiments have also been carried out while using different enzyme concentrations in the wash solution, viz. in the interval between 0.02 and 0.16 Anson units per liter of wash solution. For the experiments EMPA test swatches No. 116 were used and the detergent was the same as that used in connection with the first mentioned washing experiments, viz.

| | |
|---|---|
| Nansa S (40% sodiumalkylarylsulphonate, 60% sodiumsulphate | 250 g |
| Nonylphenol, 10 EO | 30 g |
| Soap (80%) | 30 g |
| Sodiumtripolyphosphate | 300 g |
| CMC (60%) | 16 g |
| Sodiumcarbonate, anhydr. | 80 g |
| Sodiumsulphate, anhydr. | 74 g |
| Sodiumperborate (NaBO$_3$,4 H$_2$O | 220 g |
| Total | 1000 g |

The test conditions were as follows:

| | |
|---|---|
| Water | 10° German hardness |
| Fabric to water ratio | 1:40 |
| Period | 30 minutes |
| Temperature | 45°C and 60°C |
| pH | about 10 |
| Detergent concentration | 4.0 g per liter of wash solution |

The procedure is the same as that reported in the first mentioned experiments, except that the concentration of the enzyme solution was varied so that the activity in the wash solution gets the following values:

0.02 – 0.04 – 0.08 – 0.16 Anson units per liter

Before the detergent solution was mixed with the enzyme solution it was adjusted to 50°C and 68°C, respectively, corresponding to a temperature of 45°C and 60°C, respectively, in the wash solution ready for use.

Each enzyme preparation was tested at both temperatures. The results of the remission measurements are collected in the following Table XII.

TABLE XII

Remission of EMPA-test swatches 116

| Enzyme from strain | Temperature °C | Anson units per liter of wash solution |  |  |  |  |
|---|---|---|---|---|---|---|
|  |  | 0 | 0.02 | 0.04 | 0.08 | 0.16 |
| C 303 | 45 | 15.0 | 25.8 | 28.2 | 33.5 | 36.8 |
| C 339 | 45 | 16.02 | 25.8 | 29.7 | 32.5 | 36.0 |
| C 351 | 45 | 15.7 | 26.0 | 30.8 | 34.2 | 37.3 |
| C 367 | 45 | 14.0 | 25.2 | 28.3 | 31.7 | 36.3 |
| C 377 | 45 | 16.5 | 29.2 | 32.2 | 36.8 | 41.7 |
| C 364 | 45 | 15.3 | 27.2 | 29.3 | 33.7 | 36.7 |
| C 372 | 45 | 16.2 | 33.0 | 36.6 | 42.0 | 46.1 |
| C 376 | 45 | 17.5 | 30.0 | 33.7 | 36.3 | 39.8 |
| C 366 | 45 | 16.7 | 31.8 | 34.0 | 38.3 | 46.7 |
| C 303 | 60 | 19.2 | 29.8 | 32.0 | 34.1 | 36.1 |
| C 339 | 60 | 16.9 | 20.9 | 21.7 | 25.4 | 28.8 |
| C 351 | 60 | 17.4 | 27.0 | 28.8 | 32.4 | 34.4 |
| C 367 | 60 | 17.3 | 28.8 | 30.3 | 32.6 | 34.1 |
| C 377 | 60 | 17.4 | 27.0 | 28.8 | 32.4 | 34.4 |
| C 364 | 60 | 20.8 | 28.7 | 29.8 | 33.0 | 33.5 |
| C 372 | 60 | 17.0 | 21.3 | 23.7 | 25.7 | 29.1 |
| C 376 | 60 | 19.0 | 28.4 | 31.4 | 33.6 | 35.5 |
| C 366 | 60 | 19.0 | 32.0 | 32.5 | 35.0 | 38.9 |

The remission values are average figures from the six measurements.

Finally, there have been carried out the following Storage stability experiments (shelf life)

Each enzyme preparation was mixed in a Turbola mixer with Detergent Formulation A. Corresponding experiments were carried out with the same detergent, except that the perborate was substituted by anhydrous sodium sulphate. The water content in the detergent not containing perborate was 2.7 percent. The water content in the detergent containing perborate was naturally correspondingly higher because the perborate contains about 47 percent water of crystallization.

All the mixtures were analyzed for proteolytic activity immediately after they were made and then placed in sealed glass containers at 40°C. The analysis for proteolytic activity was repeated with certain intervals. The analyses were carried out as follows:

From 12 different places in the glass containers there was taken a sample weighing 12.5 g which was transferred to a 1 liter volumetric flask. In respect of the perborate-containing mixture there were added 4.4 g sodium sulphite for the purpose of neutralizing the perborate. Deionized water was added up to the mark, and the solution was then kept for 30 minutes at 25°C while stirring mechanically. Then the proteolytic activity was determined in Anson units.

The mixtures tested and the residual proteolytic activity measured at the various periods of storage have been compiled in the following Table XIII.

The enzyme preparations or compositions according to the invention for use in the detergent industry may also contain other enzymes showing utility in the washing processes. Quite a number of such enzymes are known in the art.

When the enzyme preparations or compositions according to the invention are intended for use as an active constituent of detergent compositions, the enzyme preparations are usually marketed as a powder, of which the active enzyme or enzymes constitute a minor amount, the balance of the powder consisting of inorganic salts, such as sodium sulphate, calcium phosphate and sodium chloride, sometimes together with other substances forming constituents of the final detergents.

As proteolytic enzymes have already found use as constituents of detergent compositions, all persons skilled in the art will know how to make the enzyme preparations or compositions according to the invention suited for use in detergent compositions.

It is an essential advance for use in detergent compositions that many of the enzymes according to the invention show optimal proteolytic activity at elevated pH-values and improved stability in the presence of perborates.

As it has been mentioned in the foregoing the enzyme preparations or compositions according to the in-

TABLE XIII.—STORING PERIODS

| Detergent plus enzyme from strain | Perborate | Anson units per gram of enzyme and percentage of activity after storing at 40° C. in— | | | | | | | | | | | | | | | |
|---|---|---|---|---|---|---|---|---|---|---|---|---|---|---|---|---|---|
| | | 0 days | | 1 day | | 3 days | | 5 days | | 8 days | | 14 days | | 21 days | | 28 days | |
| | | AU/g. | Act., percent | AU/g. | Act., percent | AU/g. | Act., percent | AU/g. | Act., percent | AU/g. | Act., percent | AU/g. | Act., percent | AU/g. | Act., percent | AU/g. | Act., percent |
| C 303 | − | 2.90 | 100 | 2.94 | 101 | 2.85 | 100 | | | 3.00 | 103 | 2.95 | 101 | 2.80 | 97 | 3.00 | 103 |
| | + | 2.90 | 100 | 2.78 | 96 | 2.90 | 100 | | | 2.50 | 86 | 2.50 | 86 | 1.86 | 67 | | |
| C 367 | − | 4.20 | 100 | 4.00 | 95 | 3.60 | 86 | | | 3.72 | 88 | 3.80 | 90 | 3.95 | 94 | | |
| | + | 4.20 | 100 | 4.20 | 100 | 4.30 | 80 | | | 2.30 | 55 | 2.00 | 47 | 1.90 | 45 | | |
| C 377 | − | 2.65 | 100 | 2.50 | 94 | 2.38 | 90 | | | 2.40 | 90 | 2.50 | 94 | 2.41 | 90 | | |
| | + | 2.65 | 100 | 2.65 | 100 | 2.30 | 86 | | | 1.62 | 61 | 0.37 | 52 | 1.44 | 54 | | |
| C 364 | − | 0.70 | 100 | 0.70 | 100 | | | 0.72 | 103 | 0.72 | 103 | 0.66 | 94 | 0.70 | 100 | | |
| | + | 0.70 | 100 | 0.70 | 100 | | | 0.72 | 103 | 0.57 | 81 | 0.46 | 66 | 0.43 | 61 | | |
| C 372 | − | 2.97 | 100 | 2.97 | 100 | | | 3.00 | 100 | 3.00 | 100 | 2.94 | 100 | 3.00 | 100 | | |
| | + | 2.84 | 100 | 2.57 | 90 | | | 2.10 | 74 | 2.10 | 74 | 1.40 | 49 | 1.03 | 36 | | |
| C 376 | − | 8.60 | 100 | 7.70 | 90 | | | 8.60 | 100 | 8.60 | 100 | 8.00 | 93 | 8.10 | 94 | | |
| | + | (7.90) | | 8.20 | 96 | | | 7.70 | 90 | 7.70 | 90 | 7.00 | 81 | 5.50 | 64 | | |
| C 366 | − | 0.90 | 100 | 0.86 | 95 | | | 0.94 | 104 | 0.94 | 104 | 0.87 | 97 | 0.85 | 95 | | |
| | + | 0.90 | 100 | 0.70 | 78 | | | 0.70 | 78 | 0.70 | 78 | 0.71 | 79 | 0.68 | 76 | | |

NOTE.—AU/g.=Anson units per gram; Act. percent=Percentage of residual proteolytic activity.

The stability of some of the enzymes in the presence of perborate is considerable.

Many of the enzymes according to the invention are useful not only in the detergent compositions referred to in the above experiments, but actually useful in all kinds of detergent compositions. Such compositions may contain water-soluble soaps, anionic synthetic detergents, such as water-soluble salts of organic sulphuric reaction products, non-ionic synthetic detergents, such as compounds produced by condensation of alkylene oxide groups with an organic hydrophobic compound, ampholytic synthetic detergents and other synthetic detergents. Also builders may be present in the detergents and the enzymes according to the experiments may be combined with such builders. Examples of builders are carbonates, borates, phosphates, polyphosphates, silicates and sulphates of the alkali metals, preferably sodium.

Also organic alkaline builders may be present and combined with the enzymes according to the invention, if convenient.

vention can also be used for the purpose of dehairing skins and hides. In the old dehairing process the hides were placed in a bath containing calcium hydroxide and sodium sulphide and having a pH-value of about 12. This dehairing process is detrimental to the hairs which might be of commercial value.

During the recent years use has been made of an enzymatic dehairing process, in which use has been made of proteolytic enzymes, and the dehairing has been carried out at a lower pH-value of 7 to 10, which does not affect the quality of the hairs. On the other hand, no material swelling of the skins or hides is obtained as it was in the old dehairing process, which makes difficulties in the further processing of the skins or hides.

These difficulties are known in the art, and it has been proposed to use proteolytic enzymes showing sufficient activity at a higher pH-value than 10.

As some of the enzymes according to the invention show optimal proteolytic activity at a pH-value up to 12, these enzymes are well suited for use in dehairing processes. The following experiments are intended to illustrate the utility of some of the enzymes according to the invention for dehairing.

A salted cowhide (the butt) is sliced in pieces measuring about 20 × 4 cm. The pieces are steeped 24 hours and fat and meat are scraped off. The pieces of hide are then placed in 400 ml of different enzyme solutions contained in glasses having a volume of 500 ml. The glasses are incubated at 30°C for 24 hours. The pieces are then removed from the solutions and the hairs are scraped off with a piece of plexiglass. The dehairing effect is evaluated in accordance with the following scale:

1. Easy and complete removal of the hairs.
2. Easy removal of the hairs, but spots of hairs remained on the hide.
3. No or difficult removal of the hairs.

The proteolytic enzyme solutions used contain 1 g calcium hydroxide per 130 g of water. The amount of enzymes appears from the below Table XIV, also indicating the pH-values at the beginning and the end of the dehairing process together with the results thereof.

TABLE XIV

| No. | 1 | 2 | | 3 | | 4 | |
|---|---|---|---|---|---|---|---|
| Enzyme from strain | control | C 303 | | C 367 | | C 372 | |
| Amount of enzyme Anson units | 0 | 0.5 | 5 | 0.5 | 5 | 0.5 | 5 |
| Initial pH-value | 11.9 | 11.9 | 11.9 | 11.9 | 11.8 | 12.0 | 11.9 |
| Final pH-value | 11.9 | 11.8 | 11.8 | 11.8 | 11.8 | 11.9 | 11.8 |
| Dehairing result | 3 | 1 | 1 | 2 | 2 | 3 | 1 |

What we claim is:

1. An enzyme preparation consisting of or containing at least one proteolytic enzyme of the serine type derived from the genus Bacillus and showing optimal proteolytic activity at a pH value above about 9 and retaining 80 to 100 percent of maximum proteolytic activity at pH 12, said activities being measured against hemoglobin by the Anson method.

2. An enzyme preparation according to claim 1 wherein the proteolytic enzymes is derived from a bacterium selected from the group consisting of Bacillus species NCIB Nos. 10144 through 10148, 10281, 10284, 10286, 10288, 10301, 10304, 10306 through 10313 and 10315 through 10327.

3. A process for producing a proteolytic enzyme of the serine type showing optimal proteolytic activity against hemoglobin at a pH value above 9 and showing 80 to 100 percent of maximum proteolytic activity at pH 12 when said activities are measured by the Anson method the said method comprising aerobic cultivation of a member of the genus Bacillus selected from the group NCIB Nos. 10144 through 10148, 10281, 10284, 10286, 10288, 10301, 10304, 10306 through 30313 and 10315 through 10327 in a nutrient medium for production of proteolytic enzymes comprising assimilable carbon and nitrogen sources and maintaining the pH value of said nutrient medium between 7.5 and 10.5 during the main part of cultivation.

4. The method of hydrolyzing protein material which comprises contacting the protein material with an aqueous medium containing an enzyme preparation according to claim 1.

* * * * *

Disclaimer 3,723,250.—*Knud Aunstrup*, Farum, *Otto Andresen*, Copenhagen, and *Helle Outtrup*, Vaerlose, Denmark. PROTEOLYTIC ENZYMES, THEIR PRODUCTION AND USE. Patent dated Mar. 27, 1973. Disclaimer filed May 1, 1974, by the assignee, *Novo Terapeutisk Laboratorium A/S*.

Hereby disclaims the portion of the term of the patent subsequent to July 4, 1989.

[*Official Gazette November 26, 1974.*]

UNITED STATES PATENT OFFICE
CERTIFICATE OF CORRECTION

PATENT NO. : 3,723,250
DATED : March 27, 1973
INVENTOR(S) : Knud Aunstrup et al

It is certified that error appears in the above-identified patent and that said Letters Patent are hereby corrected as shown below:

In the drawings, Figures 1, 2 and 3, "Aktivity" should read --Activity--

Table 3, the column caption reading "Growth on nitrate $(NO_3$ as sole N-source" should read --Growth on nitrate $(NO_3^-)$ as sole N-source:--

Column 21, line 11, amend "plexiglass." to read --Plexiglas (a registered trademark of Rohm & Haas Company).--

Signed and Sealed this

Thirteenth Day of February 1979

[SEAL]

Attest:

RUTH C. MASON
Attesting Officer

DONALD W. BANNER
Commissioner of Patents and Trademarks